United States Patent Office 3,436,915
Patented Apr. 8, 1969

3,436,915
POSITION CONTROL SYSTEM
Jean Mercier, 501 Bloomfield Ave., Caldwell, N.J. 07006
Filed Aug. 2, 1966, Ser. No. 569,676
Claims priority, application France, Aug. 6, 1965, 27,527; Nov. 5, 1965, 37,379; Nov. 29, 1965, 40,084; Mar. 4, 1966, 52,052
Int. Cl. F15b 13/042
U.S. Cl. 60—52    3 Claims

ABSTRACT OF THE DISCLOSURE

The invention relates to the positioning of steering controls for a tractor or other vehicle by a reversible hydraulic motor having both manually actuated and power actuated hydraulic pressure sources with a distributor valve which controls flow passages to opposite sides of the hydraulic motor.

---

Figure 1:
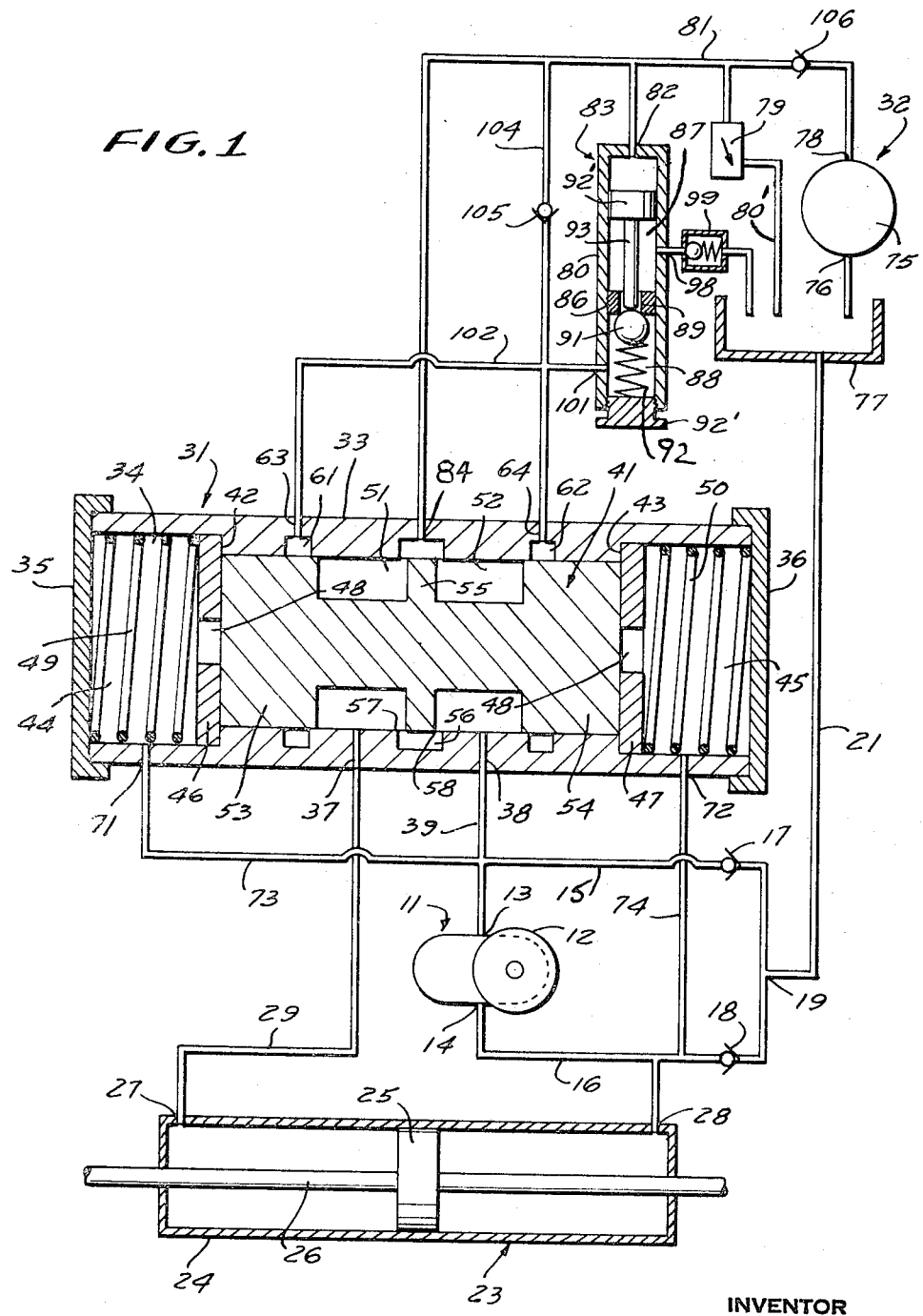

This invention relates to the art of positioning controls and more particularly to a steering control for a vehicle such as a farm tractor.

As conducive to an understanding of the invention, it is noted that where the wheels of a tractor are hydraulically controlled and a reversible hydraulic actuator is used as the means to effect movement of the steerable wheels of the tractor, due to the fact that air is normally present in any hydraulic system, difficulties arise when it is attempted to maintain the tractor in a straight path. More particularly, it has been found that approximately 10% of the volume of the reversible actuator contains air under atmospheric pressure, the remaining 90% being substantially uncompressible fluid such as a hydraulic fluid.

Thus, where the tractor is being driven along a straight path in the usual bumpy or rocky field, and one of the front wheels of the tractor, for example, should strike a rock, there would be a momentary high force exerted by the resultant movement of the wheel that would instantaneously cause compression of the gas at atmospheric pressure contained in the actuator. Where, for example, 10% of the volume of the actuator contains gas under atmospheric pressure, it has been found that under normal conditions where the wheels hit a rock, the gas in the actuator will be compressed and its pressure increased to equal the force resulting from the shock due to striking the rock and such gas will be compressed to say 50% of its original volume wtih the result that the piston of the actuator can move due to compression of the gas, and such movement where the wheels have a total range of movement of 100 degrees, would be 5% of such range or say, 5 degrees.

Consequently, even though the driver is rigidly holding the steering wheel which is not being moved, the wheels of the tractor will change their course by say 5 degrees and in order to maintain a straight path of movement the driver would have to rotate the steering wheel to overcome such change of direction. This problem is particularly important where the field over which the tractor is being driven is extremely rocky and the wheels are constantly engaging rocks in the path of movement, for the driver would have to be constantly moving the steering wheel back and forth through a relatively large arc in order to maintain the straight line of drive desired.

This problem is enhanced by the fact that normally the steering wheel has to be turned through a far greater angle than the wheels that it controls, so that where the driver has to compensate for a 5 degree change in direction, he may have to turn the steering wheel through an angle often in the order of 30 degrees. Because of this action it is apparent that the driver will be under constant tension and will rapidly become weary.

It is accordingly among the objects of the invention to provide a steering system which is relatively simple in construction, dependable in operation and not likely to become deranged, even after long use, and in which in neutral position when the steering wheel is not being rotated, will have the movement of the actuator greatly minimized so that shock imparted to the steerable wheels of the vehicle will cause substantially no movement of the actuator with the result that the wheels will remain in the direction which they had been set, thereby maintaining the vehicle in its desired path without need for any substantial movement of the steering wheel by the driver of the vehicle.

According to the invention, these objects are accomplished by the arrangement and combination of elements hereinafter described and more particularly recited in the claims.

Figure 2:
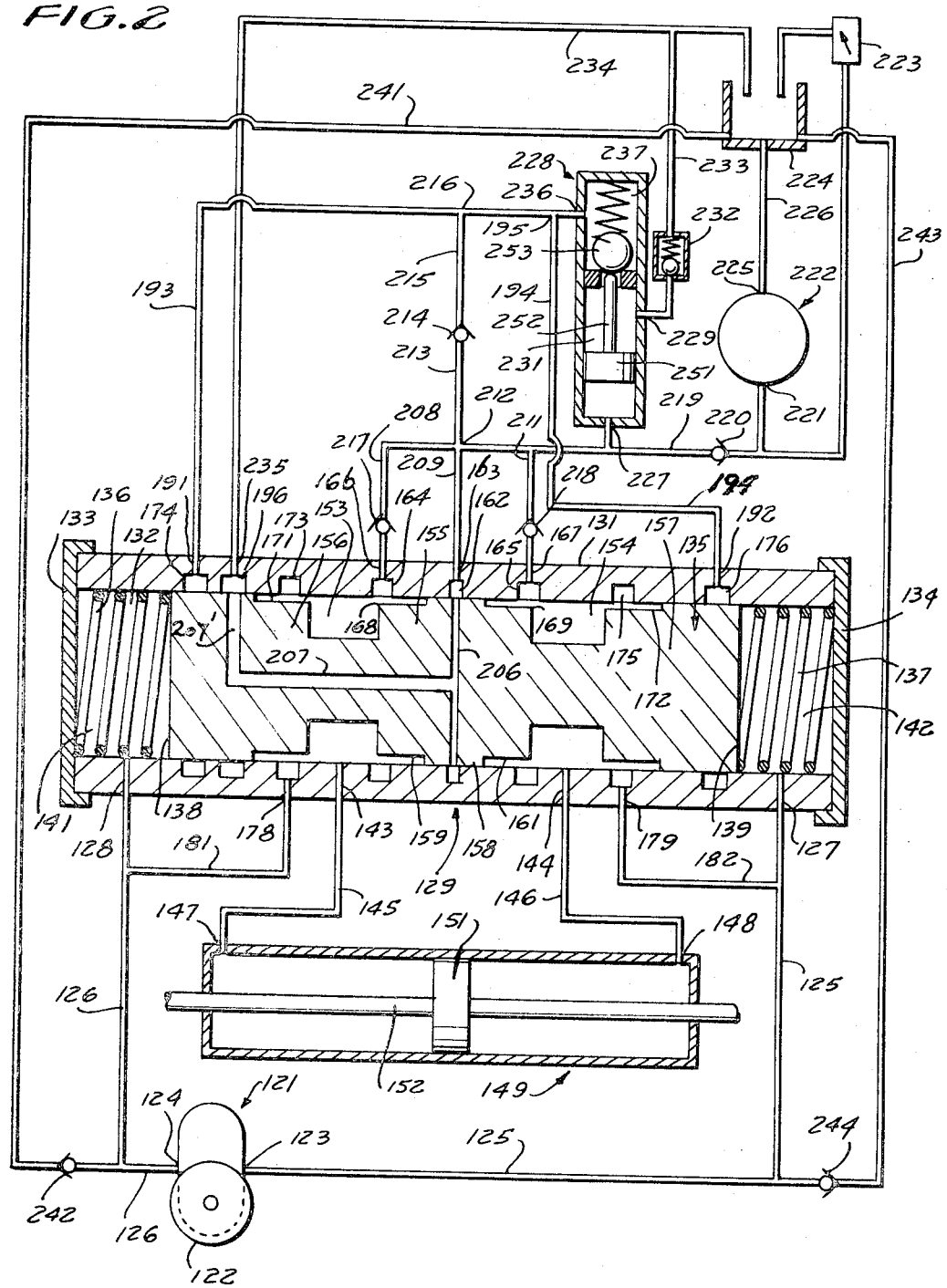
Figure 3:
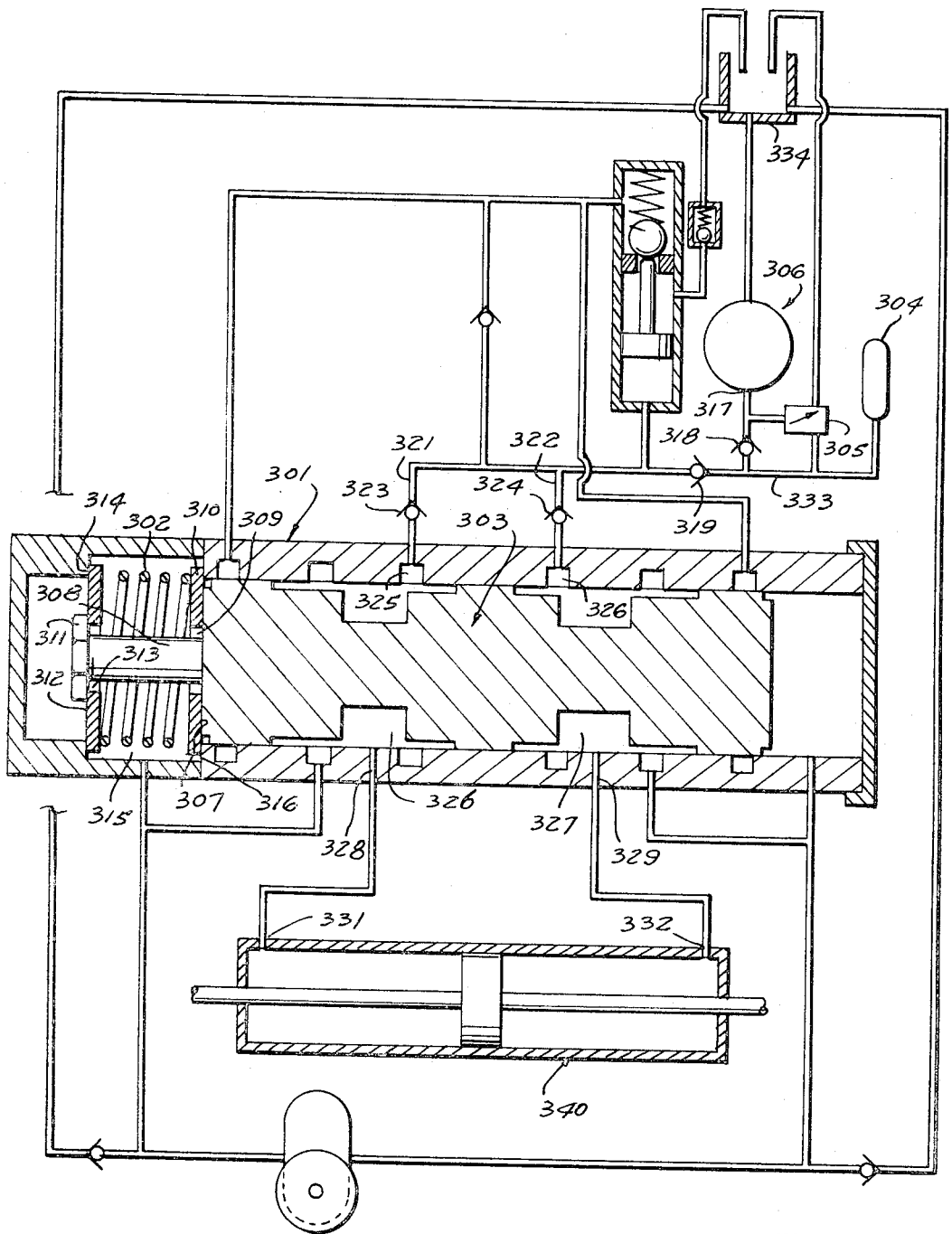

In the accompanying drawings in which are shown one or more of various possible embodiments of the several features of the invention, FIG. 1 is a diagrammatic view of one embodiment of the invention using a closed center distributor valve, FIG. 2 is a view similar to FIG. 1 of another embodiment of the invention using an open center distributor valve, and FIG. 3 is a view similar to FIG. 1 of still another embodiment of the invention, also using a closed center distributor valve.

Referring now to the drawings, the position control system shown in FIG. 1 is illustratively shown and described for use as a control for the steering wheel of a farm tractor, for example.

As shown in FIG. 1, the system comprises a pump unit 11 of conventional type, such as a bi-directional volumetric metering pump that is sold by the Ross Gear & Tool Company of Lafayette, Ind. The pump unit 11 is controlled by a steering wheel 12 so that depending upon the direction of rotation of the steering wheel, fluid under pressure will be provided at the ports 13 or 14 respectively of said pump.

The ports 13 and 14 are connected respectively by lines 15 and 16, through one-way valves 17 and 18 to junction 19, the one-way valves being positioned so that they will permit flow only from the junction 19 to the respective ports 13 or 14 as the case may be.

The junction 19 is connected by line 21 to a reservoir 77. The pump unit 11 is designed to control an actuator 23 which controls the wheels of the tractor. As shown in FIG. 1, the actuator comprises a casing 24 which has a piston 25 slidably mounted therein to which a piston rod 26 is connected, the latter illustratively extending from both ends of the casing 24. The casing of actuator 23 has control ports 27 and 28 adjacent each of its ends. The control port 28 is connected to the port 14 of pump 11. The control port 27 is connected by line 29 to a hydraulically controlled distributor valve 31 which controls the flow of fluid both from the manually operated pump unit 11 and from the motor driven high pressure power source 32. Illustratively, the distributor valve is shown on a much larger scale than the actuator.

As shown in FIG. 1, the distributor valve 31 comprises a cylindrical casing 33 having a bore 34 therethrough, the ends of which are closed by end caps 35 and 36.

The distributor valve 31 has two control ports 37 and 38 centrally located along the length of the casing 33. The line 29 from port 27 of the actuator 23 is connected to control port 37 and the control port 38 is connected by line 39 to port 13 of pump unit 11. Slidably mounted in the casing 33 of distributor valve 31 is a valve member or spool 41 which is normally retained in the neutral position shown. To this end, the bore of casing 33 is of enlarged diameter at each of its ends defining annular shoulders 42, 43, the length of the valve member 41 being substantially equal to the distance between said annular shoulders 42, 43.

Positioned in the chambers 44, 45 defined at each end of the casing 33 between the annular shoulder 42, 43 and the associated end caps 35, 36 is a disc 46, 47 which has a central opening 48 therein. The disc is normally retained against the associated shoulder 42, 43 by a coil spring 49, 50 positioned in each of the chambers 44, 45 and compressed between the end cap and the associated disc. Thus, the valve member 41 will be retained in the neutral position shown.

As shown in FIG. 1, the valve member 41 has two longitudinally spaced annular grooves 51, 52 defining end sealing portions 53, 54 and a central annular control portion 55. The casing 33 has a central annular groove 56 with which the central control portion 55 is aligned when the valve member is in neutral position. As is clearly shown in FIG. 1, the width of the central control portion 55 is slightly less than the width of the annular groove 56 so that in neutral position of the valve member 41 there will be a relatively small passageway 57, 58 provided on each side of the central control portion 55 leading into the annular groove 56 from each of the annular grooves 51, 52.

By reason of the passageways 57, 58, in the manner hereinafter to be described, fluid under pressure will be applied to the ports 27 and 28 of the actuator 23 thereby permitting substantially instantaneous response of said actuator when the steering wheel 12 is actuated.

In addition, the bore of casing 33 has two longitudinally spaced annular grooves 61, 62 on each side of the groove 56 respectively and aligned with the end portions 53, 54 when the valve member 41 is in the neutral position shown, ports 63, 64 leading into said grooves 61, 62.

In order to effect movement of the valve member 41, each of the chambers 44, 45 has a port 71, 72 leading thereinto. The port 71 is connected by line 73 to port 13 of pump unit 11 and the port 72 is connected by line 74 to the port 14 of pump unit 11.

The main power source 32 comprises a motor driven pump 75 which is designed to deliver fluid under high pressure in the order of say 1,200 p.s.i. The motor driven pump 75 has an inlet port 76 connected to reservoir 77 and an outlet port 78 connected to pressure relief valve 79 which discharges into reservoir 77 through line 80'. In addition, the port 78 is connected by line 81 to the inlet port 82 at one end of the casing 80 of a pressure controlled valve 83 and to port 84 which leads into annular groove 56. The pressure controlled valve 83 has a transverse wall 86 therein defining two chambers 87, 88. The wall 86 has a bore therethrough defining a valve seat 89 against which is normally retained a ball valve 91 retained in place by a coil spring 92 positioned in said chamber 88. Slidably mounted in chamber 87 is a piston 92' which carries a pin 93 that extends into said bore and is designed to move the ball 91 off its seat when the pressure of the fluid applied to port 82 exceeds a predetermined amount based on the tension of spring 92.

The chamber 87 has a port 98 connected through one-way valve 99 to reservoir 77. The chamber 88 has a port 101 which is connected by line 102 to the ports 63, 64 of the casing 33 that are in communication with annular grooves 61, 62. The lines 81 and 102 are connected by line 104 which has a one-way check valve 105 therein that is positioned to permit flow only in direction from line 102 to line 81. A check valve 106 is positioned between the outlet 78 of pump 75 and the line 81 so that fluid can only flow in direction from said outlet through said line 81.

In the operation of the system shown in FIG. 1, before the steering wheel 12 is turned, the valve member 41 will be retained in the neutral position shown by reason of the opposed coil springs 49, 50.

With the pump 75 energized, fluid under pressure will flow from the outlet 78 of the pump through check valve 106 and line 81 to the port 84 of the casing 33 into annular groove 56 and thence through the relatively small passageways 57, 58, through ports 37, 38 and line 29 to port 27 of the actuator and from port 38 through ports 13, 14 of the pump 11 to port 28 of the actuator. Consequently, the pressure on both sides of the piston 25 will be equalized and the chambers on each side of said piston will be charged with fluid under pressure with any gas therein compressed. Based upon the setting of the relief valve 79, the pressure in said line 81 can be retained at a predetermined pressure in the order of 1200 p.s.i.

When the steering wheel 12 is rotated in direction say to provide fluid under pressure at port 14, there will be pressure applied through line 74 to port 72 of the distributor valve 31 as well as to port 28 of actuator 23. As the pressure in chamber 45 connected to port 72 is greater than that in chamber 44, the slidable valve member 41 will move to the left from the position shown in FIG. 1.

As a result of such movement, the opening 58 will be further opened and the fluid from the pump 75 will flow through port 38, line 39, through ports 13, 14 of pump 11, line 16 into port 28 of the actuator 23 to move the piston 25 thereof to the left. The fluid to the left of piston 25 will flow through port 27, line 29, port 37, annular groove 61, which will have opened, line 102 into port 101 of the pressure control valve 83.

It is to be noted that when the pressure in line 81 from the pump 75 built up, the piston 92' and stem 93 will have moved downwardly to move ball 91 off its seat so that the fluid entering port 101 can flow from chamber 88 into chamber 87 and be discharged through port 98 and spring loaded valve 99 into the reservoir. As a result, movement of the piston 25 is permitted.

By reason of the check valve 99, if the device being actuated by the piston rod 26 should suddenly come free to move, due to the sudden drop in pressure in the actuator on the left side of the piston, the spring urged check valve 99 would close to prevent further flow and hence the device being actuated would remain in its set position.

Once the steering wheel is stopped, the pressure in chamber 45 would immediately drop and the compressed spring 49 would restore the valve member 41 to neutral position to stop further flow of fluid.

When the steering wheel 12 is turned in the reverse direction the axis will function in the manner above described, but also in reverse direction.

The system shown in FIG. 2 is also designed for the same use as the system shown in FIG. 1. As shown in FIG. 2, the system comprises a pump unit 121 which, in the embodiment shown, is preferably a gear pump of conventional type controlled by a steering wheel 122. Depending upon the direction of rotation of the steering wheel, fluid under pressure will be provided at the ports 123 or 124 of the pump unit 121.

The ports 123, 124 of the pump unit are connected by lines 125, 126 to the control ports 127, 128 of a hydraulically controlled distributor valve 129. The distributor valve 129 which is of the open center type, comprises a casing 131 having a bore 132 therethrough, closed at its ends by end caps 133, 134. Slidably mounted in the bore 132 of the distributor valve is a valve member or spool 135 which is normally retained in the neutral position shown by coil springs 136 and 137 compressed between the associated end caps 133 and 134 and the ends 138, 139 of the valve member 135, said coil springs being positioned in chambers 141 and 142 formed between said ends of the valve member and the respective ends caps.

The casing 131 of the distributor valve 129 has control ports 143, 144 connected by lines 145, 146 to ports 147, 148 of an actuator 149. The actuator 149 has a piston 151 slidably mounted therein to which is secured a piston rod 152.

The valve member 135 has two longitudinally spaced grooves 153, 154 defining a central control portion 155 and two end portions 156, 157. The central control portion 155 is of reduced diameter on each side of the central portion thereof defining a centering guide rib 158, the reduced portions defining capillary passageways 159, 161. Centrally located in the bore of the casing of the distributor valve is an internal annular groove 162 with which the centering guide portion 158 is aligned when the valve member 135 is in neutral position. The annular groove 162 is in communication with a port 163 leading into the casing 131.

Positioned on each side of annular groove 162 is a pair of spaced annular grooves 164, 165 to which ports 166, 167 are connected. In neutral position of the valve member, the annular grooves 164, 165 will be substantially closed by the central portion 155, there being small passageways 168, 169 defined at the outer end of such central portion 155 so that communication will be provided between the annular grooves 153, 154 and the annular grooves 164, 165 respectively.

The end portions 156, 157 are of reduced diameter as at 171, 172 at their inner portions as is clearly shown in FIG. 2. Associated with each of said end portions 156, 157 is a pair of spaced annular grooves 173, 174 and 175, 176. Leading into each of the grooves 173, 175 is a port 178, 179, connected respectively by line 181, 182 to the lines 126, 125. The casing also has a pair of ports 191, 192 in communication with the annular grooves 174, 176, said ports being connected by lines 193, 194 to junction 195. In addition, the end portion 156 has a third annular groove 196 positioned between the annular grooves 173 and 174.

As shown in FIG. 2, the valve member 135 has a transverse bore 206, the ends of which will be aligned with annular groove 162 when the valve member is in neutral position. A passageway 207 extends between said bore 206 and a transverse bore 207' which is in communication with annular groove 196 when the valve member is in neutral position.

As shown in FIG. 2, the three ports 166, 163 and 167 associated with the central annular grooves 164, 162 and 165, are connected by lines 208, 209 and 211 to junction 212 and this junction is connected by line 213 through one-way valve 214 and line 215 to a junction 216, which is connected to junction 195, one-way valves 217, 218 being positioned in lines 208, 211. From junction 212 a line 219 extends through one-way valve 220 to the pressure outlet port 221 of a motor driven pump 222 which is designed to furnish high pressure in the order of say 4,000 p.s.i. In addition, the line 219 extends to the inlet port of a pressure relief valve 223, the outlet port of which is connected to reservoir 224 to which the inlet port 225 of the pump 222 is also connected by line 226. It is to be noted that the relief valves 217, 218 and 220 are designed to permit flow in direction only from the outlet port of said motor driven pump 222.

Connected to line 219 is the pressure inlet port 227 of a pressure controlled check valve 228 identical to the valve shown in FIG. 1. The port 229 of the pressure controlled relief valve which leads into the chamber 231 thereof is connected through one-way valve 232 by line 233 to the reservoir 224 and by line 234 to the port 235 of the distributor valve in communication with annular groove 196. The port 236 of the valve 228 in communication with chamber 237 is connected to junction 195 and also by line 194 to port 192 of distributor valve 129. The reservoir 224 is also connected by line 241 through one-way valve 242 to line 126 and by line 243 through one-way valve 244 to the line 125. Both of said valves are designed to permit flow only from the reservoir to the ports 124, 123 respectively of the pump unit 121 to permit filling of such pump unit when it is rotated to prevent cavitation.

In the operation of the system shown in FIG. 2, before the steering wheel 122 is rotated, the valve member 135 will be retained in the neutral position shown by reason of the opposed coil springs 136, 137.

When the high pressure pump 222 is energized, fluid under pressure will flow from the outlet 221 of the pump through check valve 220 and line 219 to port 227 of valve 228 and to lines 211, 209, and 208.

The fluid flowing through lines 211, 208 will pass through valves 218, 217, ports 167 and 166 and through associated annular grooves 165 and 164 into annular grooves 154 and 153 to control ports 144, 143 into the ports 148, 147 on each side of the piston 151 of actuator 149. As ports 178, 179 are closed at this time, the pressure on both sides of the piston 151 will build up equally to compress the gas therein and the piston 151 will remain in the position shown.

In addition, the fluid under pressure will flow through line 209 to the associated port 163 and annular groove 162 and pass through bore 206 and passageway 207 into annular groove 196 to be discharged through line 234 to the reservoir 224.

In the event the tension of springs 136, 137 is not exactly equal, the bore 206 may not be exactly aligned with groove 162. However, the flow of fluid into bore 206 would tend to react against one side thereof more than the other thereby moving the valve member 135 slightly to substantially its exact neutral position.

By reason of the relief valve 223, when the pressure developed by pump 222 reaches a predetermined amount which is in the order of say, 5,000 p.s.i., thereafter if the pressure rises above this amount, the valve 223 will open to discharge into the reservoir 224.

When the steering wheel 122 is rotated in direction say to provide fluid under pressure at port 123, there will be pressure applied through lines 125 and 182 to ports 127 and 179 of the distributor valve. At this time the pressure at port 124 of pump 121 will be lower than that at port 123. Due to the greater pressure in chamber 142 of distributor valve 129 than in chamber 141 thereof, the slidable valve member 135 will move to the left from the position shown in FIG. 2.

As a result of such initial movement, the transverse bore 206 will move away from the associated annular groove 162 to cut off discharge of fluid from the main pump 222 through discharge passageway 207 back to the reservoir. As the result of the movement of valve member 135 to the left, the annular groove 165 associated with port 167 and passageway 169, will be further opened to increase the flow of fluid from the main pump 222 through port 144 into port 148 of the actuator 149. As a result, the piston 151 of the actuator will move to the left, the fluid in the chamber of the actuator on the left of the piston rod flowing through port 147, line 145, port 143, annular groove 153, through annular groove 173 which now has been exposed by such movement of the valve member and port 178, lines 181, 126 into port 124 of the pump 121. As a result, there will be a complete passage for flow of fluid into and out of the actuator 149 and hence the piston 151 thereof will be free to move to the left.

The annular groove 176 opens at the same time as groove 173 with movement of valve member 135. As a result, as the piston 151 of actuator 149 moves to the left, and discharges fluid into the low pressure port 124 of the pump 121 the fluid from the high pressure port 123 of the pump 121 flowing into the chamber 142 will then flow through annular groove 176 and line 194 into port 236 of the pressure control valve 228. When the valve member 135 moves to the left and closes the discharge port 235, the pressure in line 219 will build up so that the piston 251 of the pressure control valve 228 will move upwardly. As the result of such upward movement, the piston rod 252 will move the ball 253 off its seat so that communication is provided between the two ports 236, 229 of the pressure control valve.

Consequently, when fluid flowed through annular groove 176 into the port 236 of the control valve, it would also flow past the displaced ball 253 into the port 229 and through valve 232, thereby permitting discharge of fluid into the reservoir. By reason of the check valve 232 associated with the pressure control valve 228, there will be no flow of fluid through groove 176 and port 192 until the pressure in chamber 142 has risen to a sufficient amount.

Such pressure will only occur when the valve member 135 has moved sufficiently so that annular groove 173 is opened to permit discharge of fluid from the left hand side of the actuator, thereby permitting movement of such actuator.

Once the steering wheel 122 is stopped, the pressure in line 125 and chamber 142 will immediately drop, and the pressure on both sides of the pump 121 will be equal. Since at this time the port 123 of the pump is connected to pressure chamber 142, where there would be zero pressure from the pump 121, the compressed spring 136 will immediately move the slidable valve member 135 to the right to neutral position to stop further flow of fluid.

In the event of failure of the main pump 222, the pressure control valve 228 will remain in closed position so that the ports 236, 229 thereof will be cut off from each other. As a result, when the manual pump 121 is actuated, there will be pressure in chamber 142, for example, which will move the valve member 135 to the left and fluid will flow from port 192 through lines 194, 215, 211 into annular groove 154 and thence through port 144 into port 148 to move the piston 149 of the actuator 149 to the left.

As a result of this feature, manual operation of the actuator is permitted in the event of the failure of the main power source 305.

It is further to be noted that by reason of the lines 241 and 243 connected to the ports 124, 123 of the pump 121 there will be a supply of fluid to the pump 121 from the reservoir 224 each time the steering wheel 122 is rotated to prevent cavitation of the pump.

The system shown in FIG. 3 is identical in many respects to the embodiment shown in FIG. 2, except that the distributor valve 301 is a closed center type rather than open center type and a single spring 302 is used to urge the valve member 303 to neutral position instead of the double springs of the embodiment shown in FIG. 2. Furthermore, an accumulator 304 of conventional type is provided together with an unloader valve 305 to absorb the flow from the main pump 306 when the distributor valve is in the neutral position and the unloader valve 305 discharges when the accumulator is fully charged so that the system is pressurized at all times.

Thus, as shown in FIG. 3, the valve member 303 is normally urged to neutral position by the spring arrangement shown in the left hand of FIG. 3.

More particularly, the end 307 of the valve member 303 has the projecting stud 308 which extends through an opening 309 in a plate 310, a nut 311 being secured on the free end of the stud. A second plate 312 having a central opening 313 through which the stud extends is normally urged against an internal shoulder 314 in chamber 315 of the distributor valve 301 by means of coil spring 302 which reacts against said plate 312, 310, the latter being urged against shoulder 316. Consequently, the coil spring 302 will normally urge the valve member to the right to neutral position, its movement being limited by the abutment of nut 311 against plate 312. When the valve member 303 is in the neutral position shown, the fluid under pressure from the main pump 306 will flow from the outlet port 317 of the pump through one-way valves 318 and 319 into lines 321 and 322 and through one-way valves 323, 324 into annular grooves 325 and 326 which are slightly open as shown. As a result, there will be a slight flow of fluid into annular grooves 326 and 327 of valve member 303 and through control ports 328 and 329 into the ports 331 and 332 of the actuator 340 to retain both sides of the latter pressurized. As the pressure builds up in the line 333 from the pump, the accumulator 304 will be charged and when it reaches a predetermined charge, the unloader valve 305 will open so that there will be discharge of fluid from the outlet of the main pump into the reservoir 334.

The operation of the system shown in FIG. 3 is then identical to the operation of the system shown in FIG. 2 and previously described.

In certain cases it is desired to insure that there will be no movement of the piston of the actuator when the equipment is in neutral position. Thus, referring to FIGS. 2 and 3 for example, one-way check valves 217, 218 and 323, 324 would be provided so that no fluid could be discharged from the actuator when the unit is in neutral position.

Having thus described my invention, what I claim as new and desire to secure by Letters Patent of the United States is:

1. A position control system comprising a reversible control actuator having a pair of control ports, a manually actuated source of fluid under pressure, a power actuated source of fluid under pressure, a distributor valve interposed between said control ports of said actuator and said sources of fluid under pressure, said distributor valve having a movable valve member, said valve member having a pair of spaced annular grooves defining a central guiding portion and two end portions, a pair of spaced ports leading into said distributor valve, means normally retaining said valve member in neutral position to effect closure of said spaced ports by said end portions, an additional port between said pair of spaced ports connected to said source of fluid under pressure, said central guiding member being aligned with said additional port when said valve member is in neutral position and being formed to provide relatively small passageways, when in neutral position, between said power actuated source of fluid under pressure and said control ports of said actuator, said distributor valve having a pair of control ports in communication with the spaced annular grooves in said valve member respectively, one of said control ports being connected directly to one of said control ports of the actuator and the other of said ports being connected through said manually actuated source of fluid under pressure to the other control port of said actuator, a pressure controlled valve having a pair of chambers, a port leading into each of said chambers, a partition between said chambers having an opening defining a valve seat, spring urged valve means controlling said seat and normally retaining said opening in closed position, means controlled by the pressure of said power actuated source of fluid under pressure to move said valve means off its seat to provide communication between said ports, a reservoir, one of said ports being connected to said reservoir, said spaced ports of said distributor valve being connected to the other port of said pressure controlled valve, said distributor valve being formed to connect one of the control ports of said actuator to the other port of said pressure controlled valve upon movement of the valve member of said distributor valve, a spring urged check valve connected to the port of said pressure controlled valve leading to said reservoir, said distributor valve having a pair of control chambers operatively connected respectively to said manually actuated source of fluid under pressure and in communication with opposed ends of said valve member to effect movement of the latter when the pressure in one of said chambers exceeds a predetermined amount.

2. A position control system comprising a reversible control actuator having a pair of control ports, a manually actuated source of fluid under pressure, a power actuated source of fluid under pressure, a distributor valve interposed between said control ports of said actuator and said sources of fluid under pressure, said distributor valve having a movable valve member, said valve member having a pair of spaced annular grooves defining a central control portion and two end portions, said distributor valve having two control ports aligned with said spaced annular grooves respectively and connected respectively to the control ports of said actuator, means normally retaining said valve member in neutral position, said valve member being formed to provide relatively small passageways, when in neutral position, between said power actuated source of fluid under pressure and said control ports of said actuator, a pressure controlled valve having a pair of chambers, a port leading into each of said chambers, a partition between said chambers having an opening defining a valve seat, spring-urged valve means controlling said seat and normally retaining said opening in closed position, means controlled by the pressure of said power actuated source of fluid under pressure to move said valve means off its seat to provide communication between said ports, a reservoir, one of said chamber ports being connected to said reservoir, said distributor valve having an additional pair of ports normally closed by said end ports when said valve member is in neutral position and connected to the other chamber of said pressure controlled valve, one of said additional ports being open and connected to the manually actuated source of fluid under pressure when said valve member is moved, said distributor valve being formed to connect one of the control ports of said actuator to said other chamber port of said pressure controlled valve upon movement of the valve member of said distributor valve, a spring-urged check valve connected to the port of said pressure controlled valve leading to said reservoir, said distributor valve having a pair of control chambers operatively connected respectively to said manually actuated source of fluid under pressure and in communication with opposed ends of said valve member to effect movement of the latter when the pressure in one of the chambers exceeds a predetermined amount, said distributor valve having a further additional pair of ports normally closed by said end portions and connected to the control chambers of said distributor valve and to the opposed ports of said manually actuated source of fluid under pressure, one of said ports being opened when said valve member is moved.

3. The combination set forth in claim 2 in which means are provided connecting the opposed ports of said manually actuated source of fluid under pressure to said reservoir, one-way valves being provided to permit flow only in direction from said reservoir to the associated port of said manually actuated source of fluid under pressure.

References Cited

UNITED STATES PATENTS

| | | | |
|---|---|---|---|
| 2,020,951 | 11/1935 | Lemon | 91—460 |
| 2,816,420 | 12/1957 | Walsh | 137—625.66 |
| 2,954,756 | 10/1960 | Donner | 91—460 |
| 3,016,708 | 1/1962 | Gordon | 91—460 |
| 3,159,230 | 12/1964 | Gordon | 60—525 |
| 3,184,921 | 5/1965 | Allen | 60—525 |
| 3,198,088 | 8/1965 | Johnson | 91—420 |

CARROLL B. DORITY, Jr., *Primary Examiner.*

U.S. Cl. X.R.

91—464